(12) United States Patent
Saft et al.

(10) Patent No.: US 10,621,676 B2
(45) Date of Patent: Apr. 14, 2020

(54) SYSTEM AND METHODS FOR EXTRACTING DOCUMENT IMAGES FROM IMAGES FEATURING MULTIPLE DOCUMENTS

(71) Applicant: Vatbox, Ltd., Herzliya (IL)

(72) Inventors: Isaac Saft, Kfar Neter (IL); Noam Guzman, Ramat Hasharon (IL)

(73) Assignee: VatBox, Ltd., Herzeliya (IL)

( * ) Notice: Subject to any disclaimer, the term of this patent is extended or adjusted under 35 U.S.C. 154(b) by 0 days.

(21) Appl. No.: 15/013,284

(22) Filed: Feb. 2, 2016

(65) Prior Publication Data

US 2016/0225101 A1 Aug. 4, 2016

Related U.S. Application Data

(60) Provisional application No. 62/111,690, filed on Feb. 4, 2015.

(51) Int. Cl.
| | | |
|---|---|---|
| G06Q 40/00 | (2012.01) | |
| G06K 9/00 | (2006.01) | |
| G06K 9/32 | (2006.01) | |

(52) U.S. Cl.
CPC ....... G06Q 40/123 (2013.12); G06K 9/00442 (2013.01); G06K 9/325 (2013.01); G06K 9/3233 (2013.01)

(58) Field of Classification Search
CPC . G06K 9/3233; G06K 9/00442; G06Q 40/123
See application file for complete search history.

(56) References Cited

U.S. PATENT DOCUMENTS

| | | |
|---|---|---|
| 5,606,609 A | 2/1997 | Houser et al. |
| 5,903,876 A | 5/1999 | Hagemier |
| 6,003,016 A | 12/1999 | Hagemier |
| 7,299,408 B1 | 11/2007 | Daconta et al. |

(Continued)

FOREIGN PATENT DOCUMENTS

| | | | |
|---|---|---|---|
| JP | 2004280274 A | 10/2004 | |
| JP | 2008167009 A | 7/2008 | |

(Continued)

OTHER PUBLICATIONS

The International Search Report and the Written Opinion of the International Searching Authority for PCT/US2016/067716, ISA/RU, Moscow, Russia, dated Jul. 20, 2017.

(Continued)

Primary Examiner — Menatoallah Youssef
(74) Attorney, Agent, or Firm — M&B IP Analysts, LLC

(57) ABSTRACT

A system and method for extracting document images from images featuring multiple documents are presented. The method includes receiving a multiple-document image including a plurality of document images, wherein each document image is associated with a document; extracting a plurality of visual identifiers from the multiple-document image, wherein each visual identifier is associated with one of the plurality of document images; analyzing the plurality of visual identifiers to identify each document image; determining, based on the analysis, an image area of each document image; extracting each document image based on its image area.

17 Claims, 10 Drawing Sheets

(56) References Cited

U.S. PATENT DOCUMENTS

| | | |
|---|---|---|
| 7,809,614 B2 | 10/2010 | Drehnen et al. |
| 7,983,966 B2 | 7/2011 | Ostlund |
| 8,065,611 B1 | 11/2011 | Chan et al. |
| 8,200,642 B2 | 6/2012 | Maze |
| 8,386,394 B1 | 2/2013 | Nguyen et al. |
| 8,438,089 B1 | 5/2013 | Wasserblat et al. |
| 8,447,111 B2 | 5/2013 | King et al. |
| 8,890,978 B1 | 11/2014 | Madhani et al. |
| 9,002,838 B2 | 4/2015 | Pitzo et al. |
| 9,158,833 B2 | 10/2015 | Urbschat et al. |
| 2002/0091671 A1 | 7/2002 | Prokoph |
| 2003/0163778 A1 | 8/2003 | Shores et al. |
| 2004/0002906 A1 | 1/2004 | Drehnen et al. |
| 2004/0010451 A1 | 1/2004 | Romano et al. |
| 2004/0068452 A1 | 4/2004 | Ullrich et al. |
| 2004/0267620 A1 | 12/2004 | Feldman et al. |
| 2005/0021410 A1 | 1/2005 | Ostlund |
| 2005/0096989 A1 | 5/2005 | Ostlund |
| 2005/0273614 A1 | 12/2005 | Ahuja et al. |
| 2006/0004814 A1 | 1/2006 | Lawrence et al. |
| 2007/0168382 A1 | 7/2007 | Tillberg et al. |
| 2008/0079979 A1 | 4/2008 | Holt et al. |
| 2008/0229187 A1 | 9/2008 | Mahoney et al. |
| 2009/0171958 A1 | 7/2009 | Anderson |
| 2009/0208118 A1 | 8/2009 | Csurka |
| 2010/0161616 A1 | 6/2010 | Mitchell |
| 2010/0220929 A1* | 9/2010 | Misawa ............ G06F 16/5846 382/190 |
| 2011/0016043 A1* | 1/2011 | Dornseif ............ G06Q 20/10 705/39 |
| 2011/0022485 A1 | 1/2011 | Drehnen et al. |
| 2011/0022486 A1 | 1/2011 | Drehnen et al. |
| 2011/0138175 A1 | 6/2011 | Clark et al. |
| 2011/0255784 A1 | 10/2011 | Welling et al. |
| 2012/0078682 A1* | 3/2012 | Pinsley ............ G06Q 30/0201 705/7.29 |
| 2012/0078768 A1 | 3/2012 | King et al. |
| 2013/0051671 A1* | 2/2013 | Barton ............ G06T 7/12 382/173 |
| 2014/0006234 A1 | 1/2014 | Geisau et al. |
| 2014/0079294 A1 | 3/2014 | Amtrup et al. |
| 2014/0108210 A1* | 4/2014 | Chelst ............ G06Q 20/023 705/30 |
| 2014/0207634 A1 | 7/2014 | Edmonds |
| 2014/0344576 A1 | 11/2014 | Johnson |
| 2015/0019409 A1 | 1/2015 | Vagiri |
| 2015/0019586 A1 | 1/2015 | Raichelgauz et al. |
| 2015/0026556 A1 | 1/2015 | Stadermann et al. |
| 2015/0040002 A1 | 2/2015 | Kannan et al. |
| 2015/0106247 A1 | 4/2015 | Saft et al. |
| 2015/0235301 A1 | 8/2015 | Brady et al. |
| 2015/0242832 A1 | 8/2015 | Corritori et al. |
| 2015/0248657 A1 | 9/2015 | Loock et al. |
| 2015/0332283 A1 | 11/2015 | Witchey |
| 2015/0356174 A1 | 12/2015 | Narayana et al. |
| 2015/0378972 A1 | 12/2015 | Kapadia et al. |
| 2015/0379346 A1 | 12/2015 | Newcomer et al. |
| 2017/0147540 A1 | 5/2017 | McCormick et al. |
| 2017/0308517 A1 | 10/2017 | Josifovski et al. |
| 2017/0351968 A1 | 12/2017 | Bowers et al. |
| 2018/0012268 A1 | 1/2018 | Simantov et al. |
| 2019/0236128 A1 | 8/2019 | Guzman et al. |
| 2019/0236347 A1 | 8/2019 | Guzman et al. |
| 2019/0244048 A1 | 8/2019 | Saft et al. |

FOREIGN PATENT DOCUMENTS

| | | |
|---|---|---|
| WO | 2010143001 A1 | 12/2010 |
| WO | 2014132256 A1 | 9/2014 |

OTHER PUBLICATIONS

The International Search Report and the Written Opinion for PCT/US2016/016104, ISA/RU, Moscow, Russia, dated Apr. 14, 2016.

The International Search Report and the Written Opinion for PCT/US2016/063828, ISA/RU, Moscow, Russia, dated Apr. 13, 2017.

The International Search Report and the Written Opinion for PCT/US2016/066845, ISA/RU, Moscow, Russia, dated May 25, 2017.

The International Search Report and the Written Opinion for PCT/US2016/068536, ISA/RU, Moscow, Russia, dated Apr. 13, 2017.

The International Search Report and the Written Opinion for PCT/US2016/068714, ISA/RU, Moscow, Russia, dated May 11, 2017.

The International Search Report and the Written Opinion for PCT/US2017/012120, ISA/RU, Moscow, Russia, dated May 18, 2017.

The International Search Report and the Written Opinion for PCT/US2017/014874, ISA/RU, Moscow, Russia, dated May 18, 2017.

The International Search Report and the Written Opinion for PCT/US2017/015087, ISA/RU, Moscow, Russia, dated Jan. 26, 2017.

EP Search Report for European Patent Application No. 16 747 086.3 dated Dec. 4, 2017, The Hague.

The European Search Report for European Application No. 16890887.9, dated Jun. 5, 2019, EPO, Munich, Germany.

Notice of Deficiencies for European Application No. 16 747 086.3, dated Apr. 23, 2019, EPO, Netherlands.

The European Search Report for EP Application 17767105.4, dated Sep. 9, 2019, EPO, Munich, Germany.

The European Search Report for EP Application No. 16894794.3, The European Patent Office, The Hague, Date of Completion: Aug. 16, 2019.

The European Search Report for European Application No. 17799796.2, dated Oct. 7, 2019, EPO, Munich, Germany.

The First Office Action for Japanese Patent Application No. 2016-574128, dated Oct. 8, 2019, Japanese Patent Office, Tokyo, Japan.

The European Search Report for EP Application No. 17837704.0, The European Patent Office, The Hague: dated Jan. 29, 2020.

The European Search Report for EP Application No. 17837759.4, The European Patent Office, The Hague, dated Jan. 29, 2020.

\* cited by examiner

SYSTEM AND METHODS FOR EXTRACTING DOCUMENT IMAGES FROM IMAGES FEATURING MULTIPLE DOCUMENTS

CROSS-REFERENCE TO RELATED APPLICATIONS

This application claims the benefit of U.S. Provisional Application No. 62/111,690 filed on Feb. 4, 2015, the contents of the above referenced applications are herein incorporated by reference.

TECHNICAL FIELD

The present disclosure relates generally to analyzing documents containing images, and more particularly to generating a plurality of files based on images containing multiple documents.

BACKGROUND

The Value-Added Tax (VAT) or sales tax is a broadly based consumption tax assessed on the value added to goods and services. A particular VAT applies to most goods and services that are bought or sold within a given country or state. When a person travels abroad and makes a purchase that requires paying a VAT (or any applicable tax), that person may be entitled to a subsequent refund of the VAT for the purchase. Other taxes applied to purchases may similarly be refunded under particular circumstances. Further, sellers may offer rebates for purchases of products sold in certain locations and under particular circumstances. Such refunds of the purchase price may be reclaimed by following procedures established by the refunding entity.

The laws and regulations of many countries allow foreign travelers the right for reimbursement or a refund of certain taxes such as, e.g., VATs paid for goods and/or services abroad. As such laws and regulations are different from one country to another, determination of the actual VAT refunds that one is entitled to receive often requires that the seeker of the refund possess a vast amount of knowledge in the area of tax laws abroad. Moreover, travelers may seek refunds for VATs when they are not entitled to such refunds, thereby spending time and effort on a fruitless endeavor. Further, availability of the VAT refund may vary based on the type of purchase made and the presence of a qualified VAT receipt.

One procedure to request a refund is to physically approach a customs official at an airport, fill out a form, and file the original receipts respective of the expenses incurred during the visit. This procedure should be performed prior to checking in or boarding to the next destination. Additionally, particularly with respect to goods purchased abroad, the procedure to request a refund may require that the payer show the unused goods to a custom official to verify that the goods being exported match the goods that the payer paid VATs on.

As travelers are not familiar with specific laws and regulations for claiming a refund, the travelers may submit a claim for a refund even though they are not eligible. This procedure further unnecessarily wastes time if the traveler ultimately learns that he or she is not entitled to a refund. It would therefore be advantageous to provide a solution that would overcome the deficiencies of the prior art by providing an effective way to handle VAT refunds electronically and, preferably, over the Internet.

Furthermore, due to the hassles associated with claiming refunds and, in particular, VAT refunds, customers may not be motivated to seek such refunds. Particularly with respect to potentially large refunds, properly managed refunding platforms may be crucial for saving money. As an example, a VAT refunding platform may be important to large enterprises requiring their employees to travel for business purposes. Due to the massive amount of invoices generated by a typical enterprise, many of which may be eligible for VAT refunds, enterprises may be prone to errors during collection and verification of invoices.

Additionally, the large numbers of invoices generated by a typical enterprise ultimately results in creation of a multitude of files corresponding to the invoices. Existing solutions typically require that each invoice is contained in a separate file and, consequently, require individual scanning or otherwise capturing of each invoice. Such manual individual scanning wastes time and resources, and ultimately subject the process to more potential for human error.

It would therefore be advantageous to provide a solution that would overcome the deficiencies of the prior art.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" may be used herein to refer to a single embodiment or multiple embodiments of the disclosure.

Some exemplary embodiments disclosed herein include a method for extracting document images from images featuring multiple documents. The method comprises receiving a multiple-document image including a plurality of document images, wherein each document image is associated with a document; extracting a plurality of visual identifiers from the multiple-document image, wherein each visual identifier is associated with one of the plurality of document images; analyzing the plurality of visual identifiers to identify each document image; determining, based on the analysis, an image area of each document image; extracting each document image based on its image area.

Some exemplary embodiments disclosed herein also include a system for extracting document images from images featuring multiple documents. The system comprises a processing system; and a memory, the memory containing instructions that, when executed by the processing unit, configure the system to: receive a multiple-document image including a plurality of document images, wherein each document image is associated with a document; extract a plurality of visual identifiers from the multiple-document image, wherein each visual identifier is associated with one of the plurality of document images; analyze the plurality of visual identifiers to identify each document image; determine, based on the analysis, an image area of each document image; and extract each document image based on its image area.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

FIG. 1 is a network diagram utilized to describe the various disclosed embodiments.

DETAILED DESCRIPTION

Figure 1:
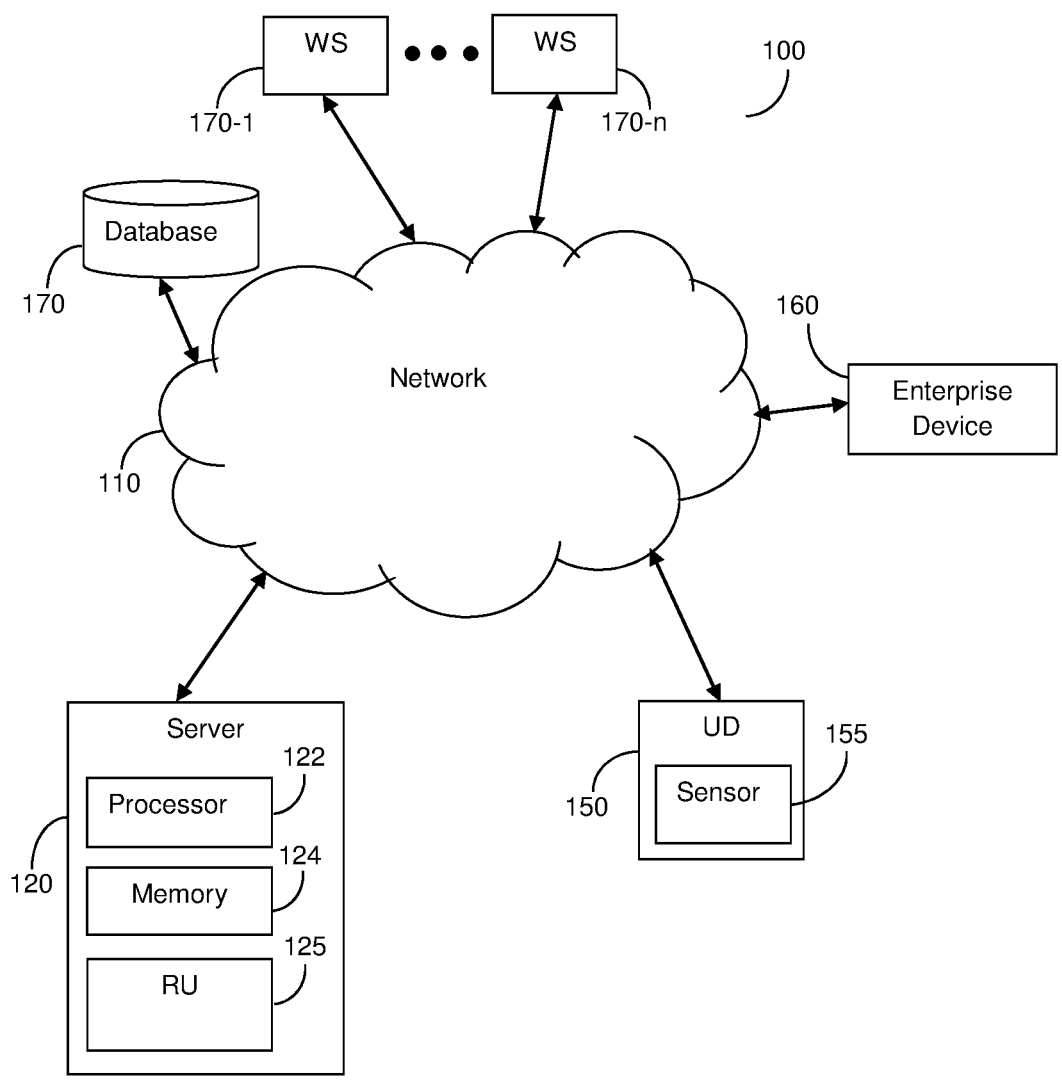

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

FIG. 1 shows an exemplary and non-limiting network diagram 100 utilized to describe the various disclosed embodiments. In an embodiment, the network diagram 100 includes a network 110 communicatively connected to a server 120, a user device 150, an enterprise device 160, a plurality of web sources 170-1 through 170-n (hereinafter referred to individually as web sources 170 and collectively as web sources 170, merely for simplicity purposes), and a database 180. The network 110 may be, but is not limited to, a wireless, cellular or wired network, a local area network (LAN), a wide area network (WAN), a metro area network (MAN), the Internet, the worldwide web (WWW), similar networks, and any combination thereof.

The user device 150 and each enterprise device 160 may be, but is not limited to, a personal computer (PC), a notebook computer, a cellular phone, a smartphone, a tablet device, a wearable computing device, a scanner, and so on. The user device 150 may include or be communicatively connected to an image sensor 155 utilized to capture images. An enterprise operating an enterprise device 160 may be, but is not limited to, a hotel, a shop, a service provider, and so on.

In an embodiment, the user device 150 captures an image (e.g., via the image sensor 155) containing multiple invoices and/or other documents. Each invoice typically includes a proof of payment for a potentially refundable purchase. The documents may be in an unorganized form, i.e., the invoices do not need to be arranged, oriented, or otherwise organized in a particular manner so long as information (e.g., words, symbols, numbers, characters, shapes, matrices, labels, barcodes, and so on) in each document is visible in the multiple-invoice image.

The user device 150 sends the captured multiple-invoice image to the server 120. The server 120 is configured to extract visual identifiers from the multiple-invoice image. The visual identifiers may include, but are not limited to, a document identification number (e.g., an invoice number), a code (e.g., a QR code, a bar code, etc.), a transaction number, a name of a business, an address of a business, an identification number of a business, a total price, a currency, a method of payment (e.g., cash, check, credit card, debit card, digital currency, etc.), a date, a type of product, a price per product, and so on.

To this end, the server 120 may include or may be communicatively connected to a recognition unit (RU) 125. The recognition unit 125 is configured to execute machine imaging processes. The recognition unit 125 is further configured to enable recognition of the visual identifiers shown in the multiple-invoice image by using one or more computer vision techniques such as, but not limited to, image recognition, pattern recognition, signal processing, character recognition, and the like. The recognition unit 125 may include, but is not limited to, an optical character recognition unit, an image recognition unit, and a combination thereof The server 120 is configured to analyze the extracted visual identifiers to identify invoice images illustrated in the multiple-invoice image. The identification may be based on a threshold of visual identifiers required for determining an invoice based on the visual identifiers. The visual identifier threshold may represent the minimum visual identifiers needed for identifying an invoice in the multiple-invoice image. The threshold may include, but is not limited to, a minimum number of visual identifiers, a particular visual identifier, a particular combination of visual identifiers, and so on. For example, a threshold requirement for identifying an invoice in an image based on visual identifiers may include a total price, a merchant identifier, and a type of product. In that example, each identified invoice in the multiple-invoice image will include a total price, a merchant identifier, and a type of product.

In an embodiment, the server 120 may be configured to determine whether any visual identifiers are required and, if so, retrieving the required visual identifiers. The required visual identifiers may be predefined such that each invoice that is identified will be suitable for further processing. For example, for a value added tax (VAT) reclaim, a location of a purchase may be a required visual identifier. Thus, if an invoice does not include a visual identifier indicating a location of the transaction, the location associated with the invoice may be retrieved.

The required visual identifiers may be retrieved from, e.g., the enterprise device 160 and/or the web sources 170. The web sources 170 may be, but are not limited to, databases in which data regarding reclaim information is stored. Such databases may include, for example, VAT information exchange systems (VIESs), tax authority databases, rebate sharing systems, and so on. Each web source 170 may be operated by an entity such as, but not limited to, a tax authority, a VAT refund agency, and the like.

The server 120 is configured to determine an image area associated with each of the identified invoice images based on the analysis. Each image area includes the visual identifiers of its respective invoice image and indicates the boundaries of the invoice image within the multiple-invoice image. The determination may include, but is not limited to, identifying a center of an invoice, identifying boundaries of each invoice image, and so on. In an embodiment, identifying the boundaries of each invoice image may be based on clean areas in the multiple-invoice image, i.e., portions of the captured image where no text appears may be identified as boundaries of the invoice images. Each image area may be a particular shape defined by its boundaries such as, for example, rectangular (i.e., a typical invoice contains text within a rectangular area). The image areas may be the same or different shapes defined by their respective boundaries.

The server 120 is configured to extract each identified invoice image based on its respective determined image area. The extraction may include creating a file for each invoice image. The extraction may further include, but is not limited to, cutting, copying, cropping each identified invoice image. Extraction via cutting may include removing each invoice image from the captured image and generating a new file for each removed invoice image such that, after extraction, the multiple-invoice image does not feature any invoices. Extraction via copying may include generating a new file for each invoice image including a copy of the invoice image such that, after extraction, the multiple-invoice image still contains all copied invoice images. Extraction by cropping includes generating a file containing a copy of the multiple-invoice image for each identified invoice image and shrinking each file based on its respective invoice image such that each file contains only the respective cropped invoice image.

The server 120 may be configured to store each extracted invoice image separately in, e.g., the database 180. The invoice images stored in the database 180 may be subsequently accessed for processing (e.g., VAT reclaim processing). In an embodiment, the server 120 may be further configured to automatically submit a VAT reclaim for any or all of the extracted invoice images. The VAT reclaim may be submitted to a refund agency via, e.g., one of the web sources 170 as described further in U.S. patent application Ser. No. 14/836,230, assigned to the common assignee, which is hereby incorporated by reference for all that it contains.

The server 120 typically includes a processing system 122 coupled to a memory 124.

The processing system 122 may comprise or be a component of a processor (not shown) or an array of processors coupled to the memory 124. The memory 124 contains instructions that can be executed by the processing system 122. The instructions, when executed by the processing system 122, cause it 122 to perform the various functions described herein. The one or more processors may be implemented with any combination of general-purpose microprocessors, multi-core processors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system 122 may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

It should be noted that the embodiments described herein above with respect to FIG. 1 are discussed with respect to a single user device 150 and a single enterprise device 160 merely for simplicity purposes and without limitation on the various disclosed embodiments. Multiple user devices 150 and/or enterprise devices 160 may be utilized without departing from the scope of the disclosure.

Figure 2:
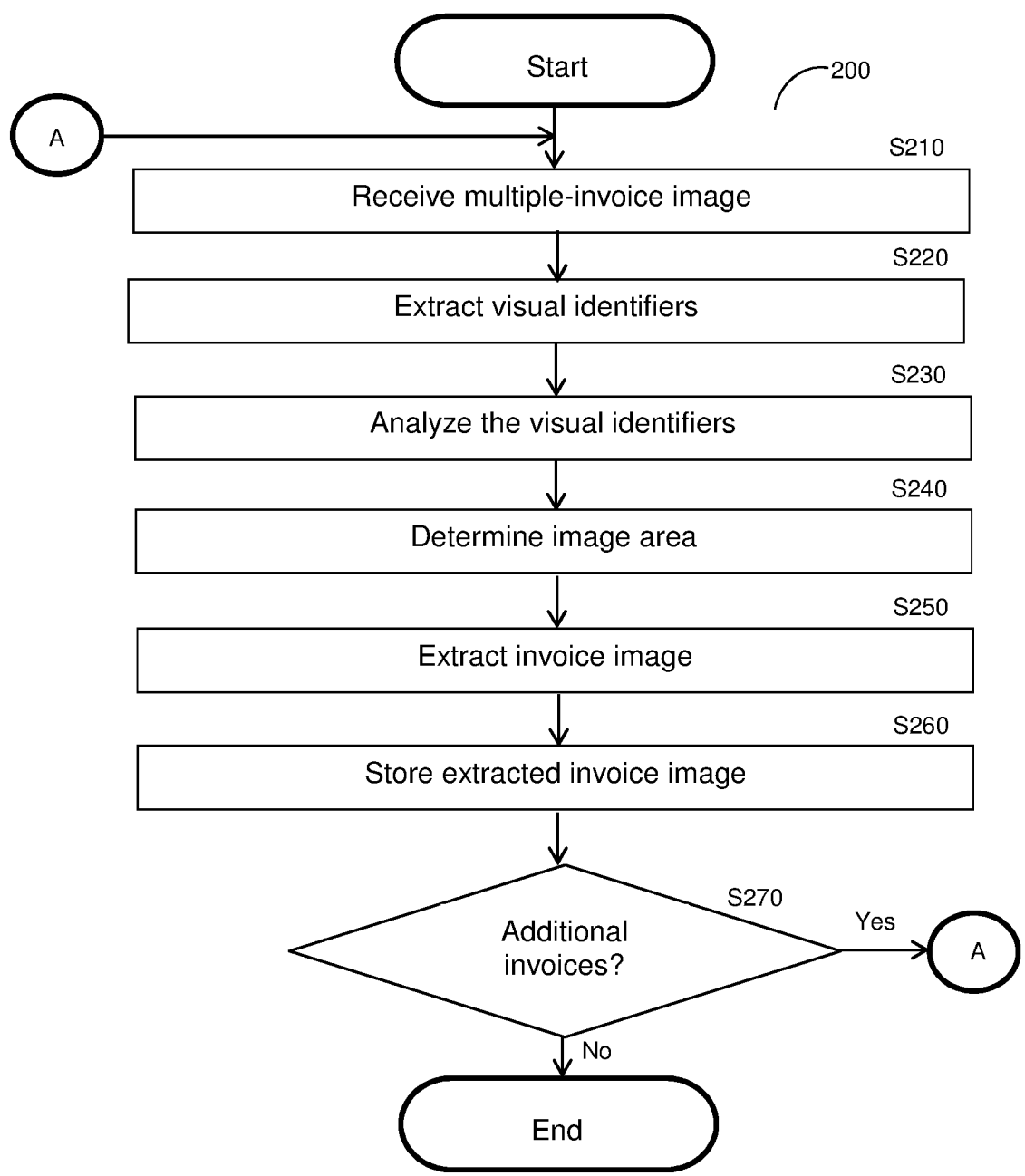
FIG. 2 is a flowchart illustrating a method for generating a plurality of invoice images from images featuring multiple invoices according to an embodiment.

FIG. 2 is an exemplary and non-limiting flowchart 200 illustrating a method for generating a plurality of invoice image files based on a multiple-invoice image according to an embodiment. In an embodiment, the method may be performed by a server (e.g., the server 120).

In S210, an image featuring multiple invoices is received. The invoices in the multiple-invoice image may be unorganized such that they are not suitable for immediate processing.

Figure 4A:
FIGS. 4A through 4E are exemplary screenshots of images featuring invoices utilized to describe the various disclosed embodiments.

An exemplary and non-limiting multiple-invoice image may be seen in FIG. 4A, which shows an exemplary and non-limiting screenshot 400A illustrating a multiple-invoice image 410 including a plurality of invoices. The invoices are unorganized such that some of the invoices are upside down, rotated, and positioned at random sections within the multiple-invoice image 410. Each invoice includes information related to a purchase of a good or service.

In S220, visual identifiers are extracted from the multiple-invoice image. Each visual identifier indicates information related to an invoice in the multiple-invoice image. The visual identifiers may include, but are not limited to, a document identification number (e.g., an invoice number), a code (e.g., a QR code, a bar code, etc.), a transaction number, a name of a business, an address of a business, an identification number of a business, a total price, a currency, a method of payment (e.g., cash, check, credit card, debit card, digital currency, etc.), a date, a type of product, a price per product, and so on. Threshold visual identifier requirements (e.g., a number or particular group of visual identifiers) may be identified based on a type of entity for which the multiple-invoice image was captured.

In S230, the extracted visual identifiers are analyzed. The analysis may yield identification of metadata associated with the multiple-invoice image. Such metadata may include, but is not limited to, a number of invoice images in the multiple-invoice image, pointer data indicating an invoice image available via one or more storage units (e.g., the enterprise device 160 or the web sources 170), a purchaser of a transaction, and so on.

In S240, an image area of an invoice image featured in the multiple-invoice image is determined based on the analysis. In an embodiment, the determination may include identifying a boundary of each invoice illustrated in the multiple-invoice image. The image area of an invoice may be defined as the area contained within the boundary of the invoice.

Figure 4B:
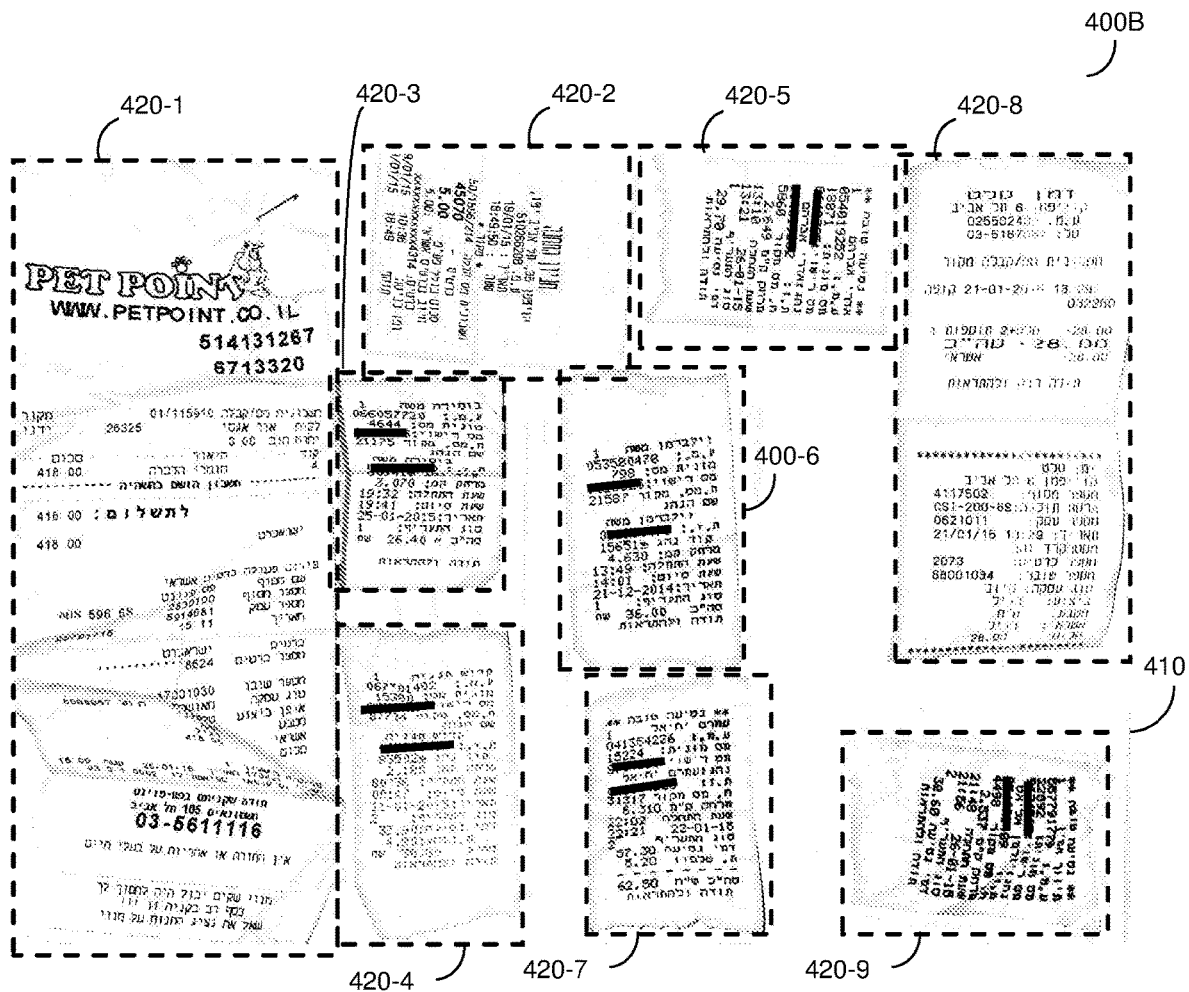

Exemplary determined image areas may be seen in FIG. 4B, which shows an exemplary and non-limiting screenshot 400B illustrating a multiple-invoice image 410 including a plurality of invoices, with an invoice image of each invoice defined by an image area within boundaries 420-1 through 420-9 (hereinafter referred to individually as a boundary 420 and collectively as boundaries 420, merely for simplicity purposes). In the exemplary screenshot 400B, each boundary 420 is rectangular and occupies a textless border around each invoice.

In S250, the invoice image is extracted from the multiple-invoice image respective of its image area. The extraction may include generating a new file for the invoice image, and may further include cutting, cropping, and/or copying the invoice image in the captured image. Exemplary methods for extracting invoice images from a multiple-invoice image are described further herein below with respect to FIGS. 3A through 3C.

Figure 4C:
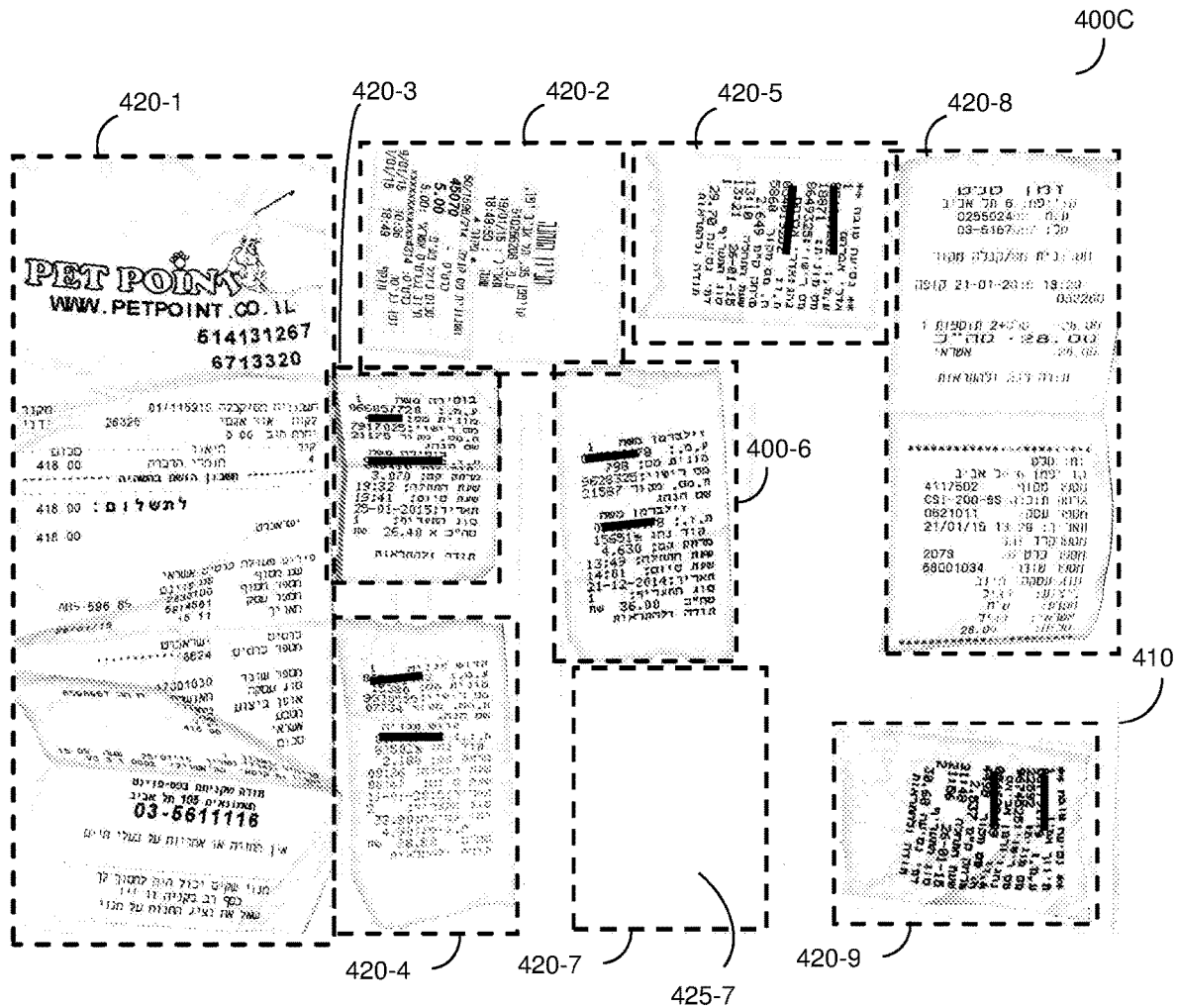

Extracting invoice images from a multiple-invoice image via cutting may be seen in FIG. 4C, which shows an exemplary and non-limiting screenshot 400C illustrating the multiple-invoice image 410 including the plurality of invoices with invoice images defined by the boundaries 420. In the exemplary screenshot 400C, the invoice image 425-7 enclosed by the boundary 420-7 has been cut from the captured image. Additional invoice images may be further cut from the captured image as demonstrated in FIG. 4E until all invoice images identified in the multiple-invoice image have been removed.

Figure 4D:

FIG. 4D shows an exemplary and non-limiting screenshot 400D illustrating the cut invoice image 425-7. A new file including only the cut invoice image 425-7 may be generated based on the cutting.

In optional S260, the extracted invoice image may be stored as a file in, for example, a database (e.g., the database 180). Stored invoice images may be subsequently processed further. For example, stored invoice images may be analyzed for value added tax (VAT) reclaim eligibility and/or sent to a refund agency.

In S270, it is determined whether additional invoice images are to be extracted from the multiple-invoice image and, if so, execution continues with S210; otherwise, execution terminates.

Figure 4E:
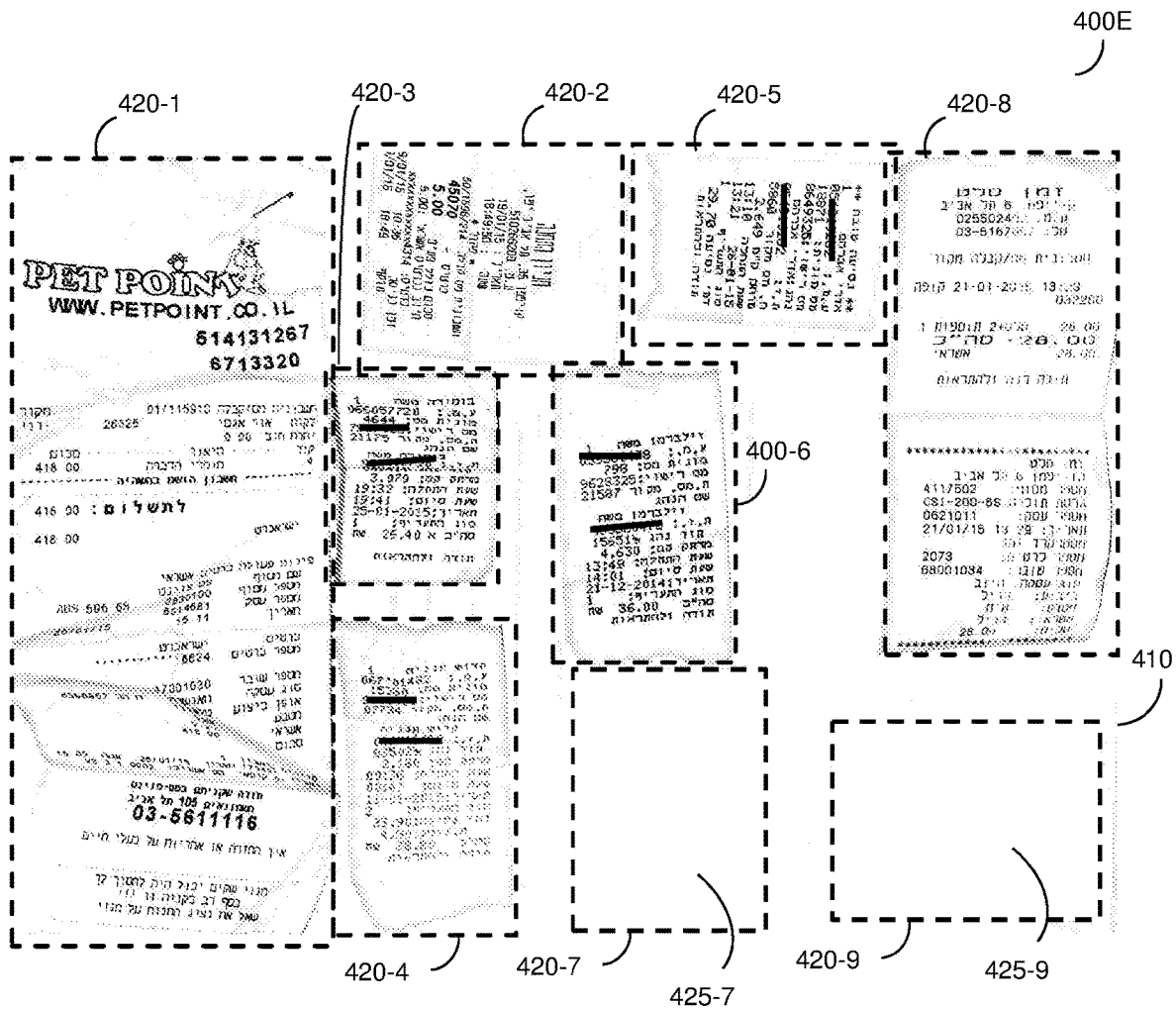

Extraction of an additional invoice image from a multiple-invoice image may be seen in FIG. 4E, which shows an exemplary and non-limiting screenshot 400E illustrating the multiple-invoice image 410 including the plurality of invoices with invoice images defined by the boundaries 420. In the exemplary screenshot 400E, the invoice image 425-9 enclosed by the boundary 420-9 has been cut from the multiple-invoice image in addition to the invoice image 425-7 enclosed by the boundary 420-7. Additional cuts would therefore remove each of the invoice images enclosed by the boundaries 420-1 through 420-6 and 420-8 until the multiple-invoice image contains no invoice images.

Figure 3A:
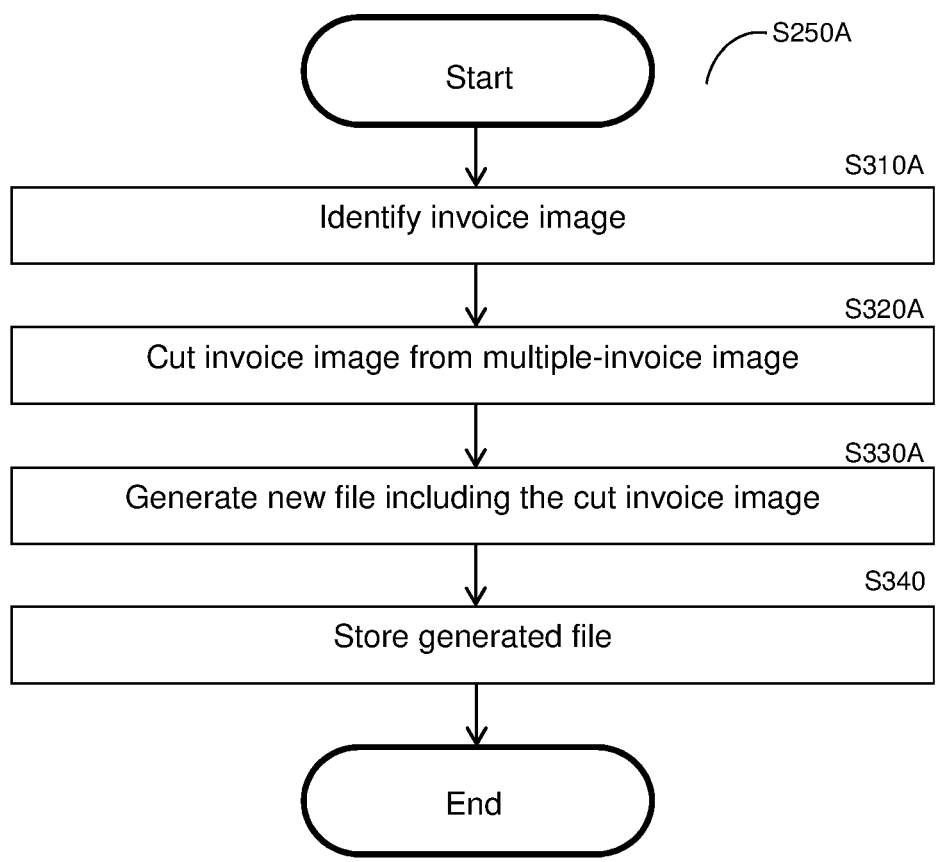
FIGS. 3A through 3C are flowcharts illustrating methods for extracting invoice images from images featuring multiple invoices according to various embodiments.

FIG. 3A is an exemplary and non-limiting flowchart S250A illustrating a method for extracting an invoice image from a multiple-invoice image via cutting according to an embodiment.

In S310A, an invoice image featured in a multiple-invoice image is identified based on its image area. In S320A, the identified invoice image is cut from the multiple-invoice image. The cut image is removed from the captured image such that it is no longer featured in the multiple-invoice image. In S330A, a new file including the cut invoice image is generated. In S340A, the generated file may be stored in, e.g., a database.

Figure 3B:
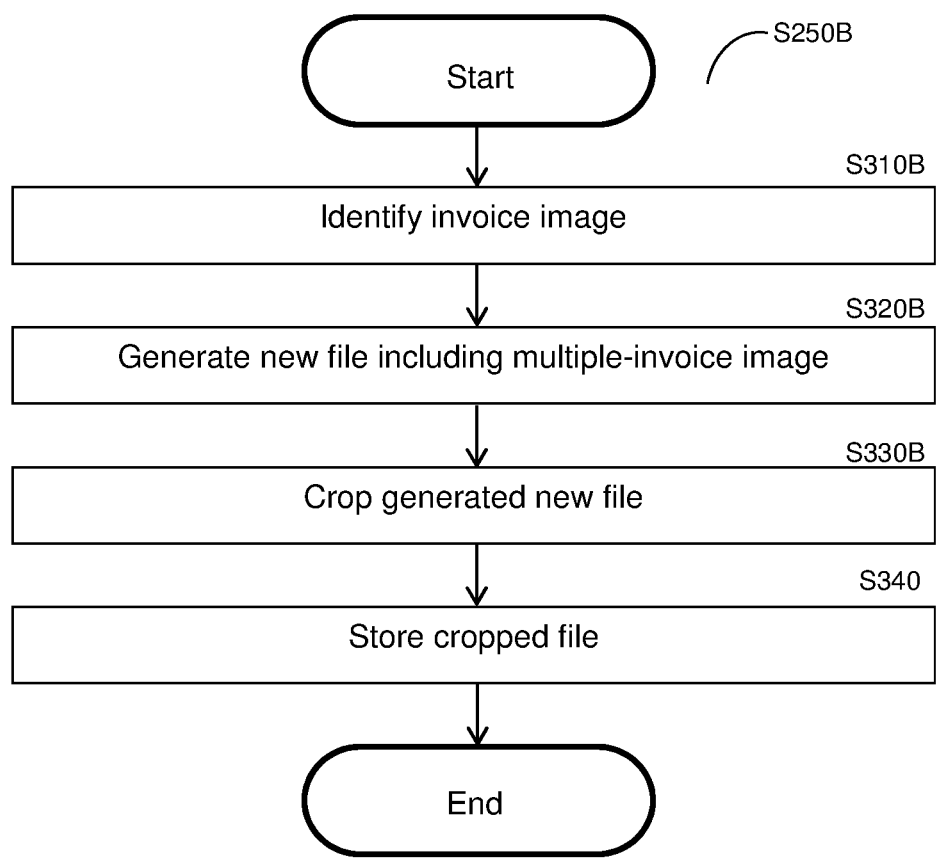

FIG. 3B is an exemplary and non-limiting flowchart S250B illustrating a method for extracting an invoice image from a multiple-invoice file via cropping according to an embodiment.

In S310B, an invoice image featured in a multiple-invoice image is identified based on its image area. In S320B, a file including the multiple-invoice image is generated. In S330B, the new file is cropped respective of the identified invoice image. The cropping may include shrinking the size of the generated file such that the cropped file only includes the invoice image. In S340B, the cropped new file may be stored in, e.g., a database.

Figure 3C:
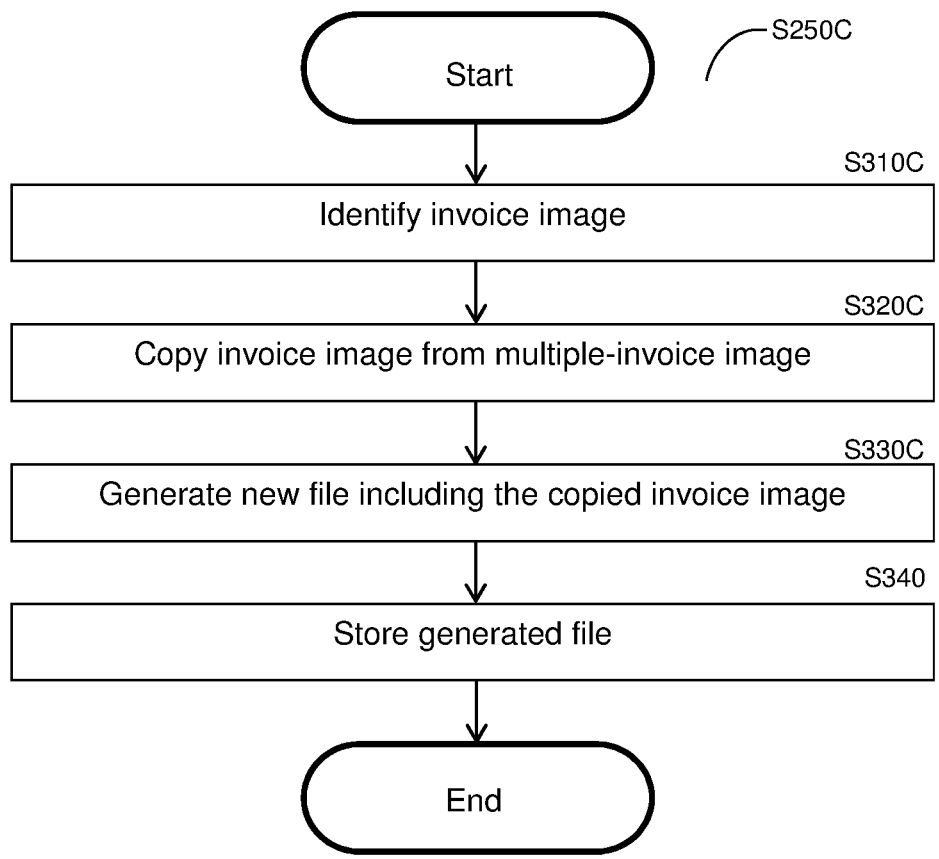

FIG. 3C is an exemplary and non-limiting flowchart S250C illustrating a method for extracting an invoice image from a multiple-invoice file via copying according to an embodiment.

In S310C, an invoice image featured in a multiple-invoice image is identified based on its image area. In S320C, the identified invoice image is copied from the multiple-invoice image. In S330C, a file including the copied invoice image is generated. In S340C, the generated file may be stored in, e.g., a database.

It should be noted that the embodiments described herein above are discussed with respect to an image featuring multiple invoices merely for simplicity purposes and without limitations on the disclosed embodiments. Images featuring other documents may be utilized without departing from the scope of the disclosure. It should be further noted that visual identifiers other than those related to VAT reclaims may be utilized to identify documents captured within images according to the disclosed embodiments. It should be further noted that the analyzed image may be either captured and sent (e.g., to the server 120) for invoice image extraction, or may be retrieved from a database, without departing from the scope of the disclosure.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for extracting document images from images featuring multiple documents, comprising:

receiving a multiple-document image including a plurality of document images, wherein each document image is associated with a document;

extracting a plurality of visual identifiers from the multiple-document image, wherein each visual identifier is text indicating information related to one of the plurality of document images;

analyzing the plurality of visual identifiers to identify each document image, wherein each document image is identified based on at least one threshold visual identifier requirement representing a portion of the plurality of visual identifiers that need to be included in each of the identified document image;

identifying, for each identified document image that meets the at least one threshold visual identifier requirement, a boundary based on the analysis, the boundary occupying a textless border around the respective identified document image and enclosing all of the plurality of visual identifiers that need to be included within the document image as represented by the at least one threshold visual identifier requirement;

determining, based on the analysis, an image area of each document image, wherein the image area of the document image is defined by the boundary; and extracting each document image based on its image area, wherein extracting each document image further comprises generating a file including the document image.

2. The method of claim 1, wherein analyzing the plurality of visual identifiers further comprises:

executing at least one machine imaging process to identify metadata associated with each visual identifier.

3. The method of claim 1, wherein each boundary is identified based on portions of the multiple-document image in which no text appears.

4. The method of claim 1, further comprising:

generating a plurality of files, each file including one of the extracted document images.

5. The method of claim 1, wherein extracting each document image further comprises at least one of: cutting the document image, copying the document image, and cropping the document image.

6. The method of claim 1, wherein the visual identifier threshold is any of: a number of visual identifiers, a particular visual identifier, and a combination of visual identifiers.

7. The method of claim 6, further comprising:

determining, for each document image, whether any required visual identifiers have not been extracted; and upon determining that at least one required visual identifier has not been extracted, retrieving the at least one required visual identifier.

8. The method of claim 7, further comprising:

determining, for each document image, an eligibility for a potential value-added tax (VAT) refund based on the visual identifiers.

9. A non-transitory computer readable medium having stored thereon instructions for causing one or more processing units to execute the method according to claim 1.

10. A system for extracting document images from images featuring multiple documents, comprising:

a processing circuitry; and a memory, the memory containing instructions that, when executed by the processing circuitry, configure the system to:

receive a multiple-document image including a plurality of document images, wherein each document image is associated with a document;

extract a plurality of visual identifiers from the multiple-document image, wherein each visual identifier is text indicating information related to one of the plurality of document images;

analyze the plurality of visual identifiers to identify each document image, wherein each document image is identified based on at least one threshold visual identifier requirement representing a portion of the plurality of visual identifiers that need to be included in each of the identified document image;

identify, for each identified document image that meets the at least one threshold visual identifier requirement, a boundary based on the analysis, the boundary occupying a textless border around the respective identified document image and enclosing all visual identifiers that need to be included within the document image as represented by the at least one threshold visual identifier requirement;

determine, based on the analysis, an image area of each document image, wherein the image area of the document image is defined by the boundary; and extract each document image based on its image area, wherein extracting each document image further comprises generating a file including the document image.

11. The system of claim 10, wherein the system is further configured to:

execute at least one machine imaging process to identify metadata associated with each visual identifier.

12. The system of claim 10, wherein each boundary is identified based on portions of the multiple-document image in which no text appears.

13. The system of claim 10, wherein the system is further configured to:

generate a plurality of files, each file including one of the extracted document images.

14. The system of claim 10, wherein the system is further configured to perform at least one of: cut the document image, copy the document image, and crop the document image.

15. The system of claim 10, wherein the visual identifier threshold is any of: a number of visual identifiers, a particular visual identifier, and a combination of visual identifiers.

16. The system of claim 15, wherein the system is further configured to:

determine, for each document image, whether any required visual identifiers have not been extracted; and retrieve the at least one required visual identifier, upon determining that at least one required visual identifier has not been extracted.

17. The system of claim 16, wherein the system is further configured to:

determine, for each document image, an eligibility for a potential value-added tax (VAT) refund based on the visual identifiers.

\* \* \* \* \*